United States Patent [19]

Keeling

[11] 4,014,173
[45] Mar. 29, 1977

[54] SYSTEM FOR INCREASING THE EFFECTIVE HEAD OF A DAM WITHOUT PHYSICALLY INCREASING THE HEIGHT OF THE DAM

[76] Inventor: Walter William Keeling, R.F.D. No. 1, Troutville, Va. 24175

[22] Filed: Nov. 5, 1975

[21] Appl. No.: 628,936

[52] U.S. Cl. .................................................. 61/19
[51] Int. Cl.² ......................................... E02B 9/00
[58] Field of Search ................... 61/19, 20; 290/52; 417/226, 240, 241

[56] References Cited

UNITED STATES PATENTS

| | | | |
|---|---|---|---|
| 404,851 | 6/1889 | Long | 61/19 |
| 640,125 | 12/1899 | Gelly | 417/226 |
| 962,355 | 6/1910 | Johnson | 61/19 |
| 996,056 | 6/1911 | Brodton | 417/226 |
| 1,704,417 | 3/1929 | Zoll | 61/19 X |
| 2,945,447 | 7/1960 | Yamaguchi et al. | 417/226 X |
| 3,338,797 | 8/1967 | Hermansen et al. | 61/19 X |

*Primary Examiner*—Dennis L. Taylor
*Attorney, Agent, or Firm*—D. Paul Weaver

[57] ABSTRACT

To increase the effective head of a dam of predetermined height and thereby increasing hydroelectric power generation, the generator driving turbine means is placed in a pit substantially below the bed level of the tailwater. Water discharged from the turbine means is utilized to operate hydraulic ram means to lift this water to ground level where it forms to join the tailwater of the dam.

4 Claims, 2 Drawing Figures

SYSTEM FOR INCREASING THE EFFECTIVE HEAD OF A DAM WITHOUT PHYSICALLY INCREASING THE HEIGHT OF THE DAM

BACKGROUND OF THE INVENTION

A drastic need exists for increased sources of energy including electrical energy worldwide. In satisfying this urgent need, various related economic and ecological considerations must be borne in mind so that research and development activities will be in the proper direction for the maximum welfare of human society. For example, in the production of increased electrical energy, care must be exercised not to further pollute the atmosphere and to pollute waterways including pollution by heating above acceptable levels.

With all of this in mind, the creation of more economical and more efficient hydroelectric power plants appears to be highly desirable in satisfying the demand for more electrical energy. The present invention is directly concerned with this objective.

This invention relates to improvements in hydroelectric power generation systems, which ordinarily utilize channeled headwater of a dam to provide energy which drives turbines to power electric generators. Rate of flow of water to the dam site, being a natural phenomenon, is one of the unalterable factors which predetermines the amount of power which can be generated from the available headwaters. The head (height) of water at the dam is the other principle factor which determines the available power output of the turbine driven electric generators. The head is predetermined basically by the height of the dam; that being a controllable factor. Every dam site, for varying reasons however, imposes its limitations as to the practical height of that particular dam, even though, ideally and generally speaking, the higher the dam the more power it is theoretically capable of generating and, consequently, the more productive it is. Even at those sites where a high dam is possible to construct, funds available for dam construction frequently limit its height to something below the optimum, due to the fact that the cost of a dam increases sharply as its height increases. Where construction cost is not the prime determining factor, dam height at a strategic or a particularly desirable site may be limited by the topography and/or other uncontrollable or undesirable conditions, resulting in inadequate power output. The remedy could be a costly one, entailing the construction of one or more dams further downstream to make up the desired power.

To remedy the situation and achieve the desired increase in hydroelectric power generation, the present invention utilizes a novel process and sound engineering principles to artificially create the maximum obtainable head of water at any dam site, with values substantially in excess of those which the height of the dam alone would be capable of producing, if unaided or unmodified, as by increasing its height. Fundamentally, this increased head is obtained by locating turbines in a dry pit near the dam, and well below the bed level of the tailwater, together with novel means for continuously removing water discharged by the turbine means and elevating this water to ground level, where it forms or joins the tailwater of the dam, by means of one or more selfenergizing impulse pumps known in the art as hydraulic rams.

Through this means, the total effective working head of the system equals the sum of the head of the dam, and the head created by the vertical drop from ground level to the sub-surface location of the turbine means. Doubling of the dam's effective head through this device is not only entirely feasible and practical but highly advantageous from an economic standpoint.

Ordinarily, to locate turbines below ground or stream bed level is impractical, or more accurately, not workable due to the fact that turbine discharge will quickly fill the pit, thus nullifying the would-be beneficial effect of the added head created by the subterranean location of the turbine means. To make it operate, the turbine pit would require continuous drainage by massive pumps utilizing auxiliary power which would consume more energy than the dam would be capable of producing. This is one of the reasons why this system has heretofore not been developed.

The present invention, however, renders the desired system entirely practical and economical to construct and maintain, and achieves the desired end of greatly increasing the effective head of any dam of predetermined fixed height and without increasing the height of the dam. The invention thus, in effect, converts low dams into high dams, allowing them to utilize for maximum efficiency impulse type turbines which are generally less expensive and easier to maintain. Conventional low dams, unless their power output potential is enhanced by a large natural supply of water, must use a more costly and less efficient, higher maintenance type of turbine, as is well known. Additionally, by means of the invention, many relatively small, natural water sources which would ordinarily be passed over as feasible dam sites for hydroelectric power production, will now become practical power generating sites for minimal construction costs.

Other features and advantages of the invention will become apparent during the course of the following detailed description.

BRIEF DESCRIPTION OF DRAWING FIGURES

DETAILED DESCRIPTION

Figure 1:
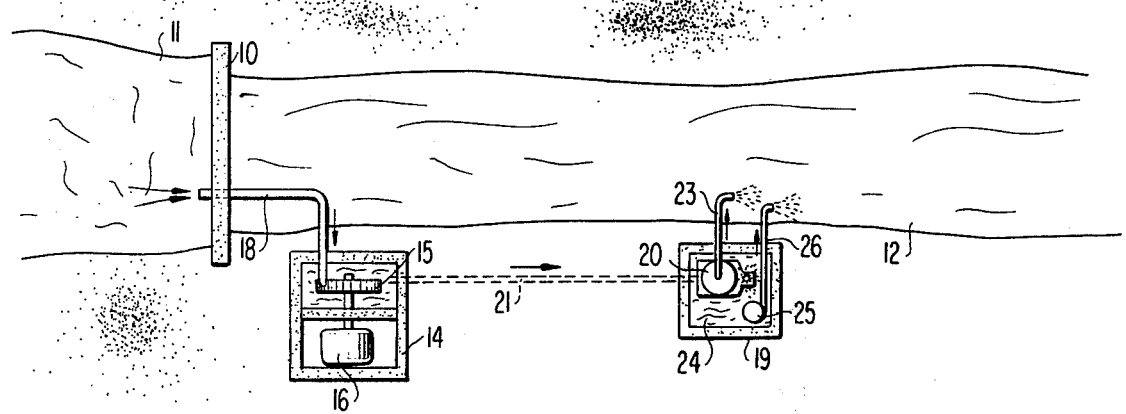
FIG. 1 is a partly schematic plan view of the invention.

Referring to the drawings in detail wherein like numerals designate like parts, the numeral 10 designates a dam of predetermined fixed height, and the numerals 11 and 12 designate headwater and tailwater on the upstream and downstream sides of the dam 10, stream bed or ground level being indicated at 13 in the drawings.

Immediately downstream from the dam 10, a dry relatively deep turbine generator well pit 14 is constructed, and the depth of this pit may equal the height of the dam 10 in a feasible and practical embodiment of the invention. In practice, the depth of the well pit 14 might vary depending upon circumstances, as indeed the heights of various dams utilizing the invention will vary.

A suitable impulse turbine means 15 and connected electrical generator means 16 is installed near the bottom of the pit 14 with the impulse turbine wheel or wheels positioned on a horizontal axis of rotation to receive water gravitating thereto from a vertical conduit 17 extending near the periphery of the turbine wheel at an elevation deep within the pit 14, as shown. A horizontal branch 18 of the delivery conduit 17 communicates with the headwater 11 through the bottom of the dam 10. It will be understood in connection with the simplified schematic illustration in the drawings that multiple turbines and generators and multiple delivery conduits may be utilized in the invention in lieu of a single turbine and generator, as shown for simplicity.

Figure 2:
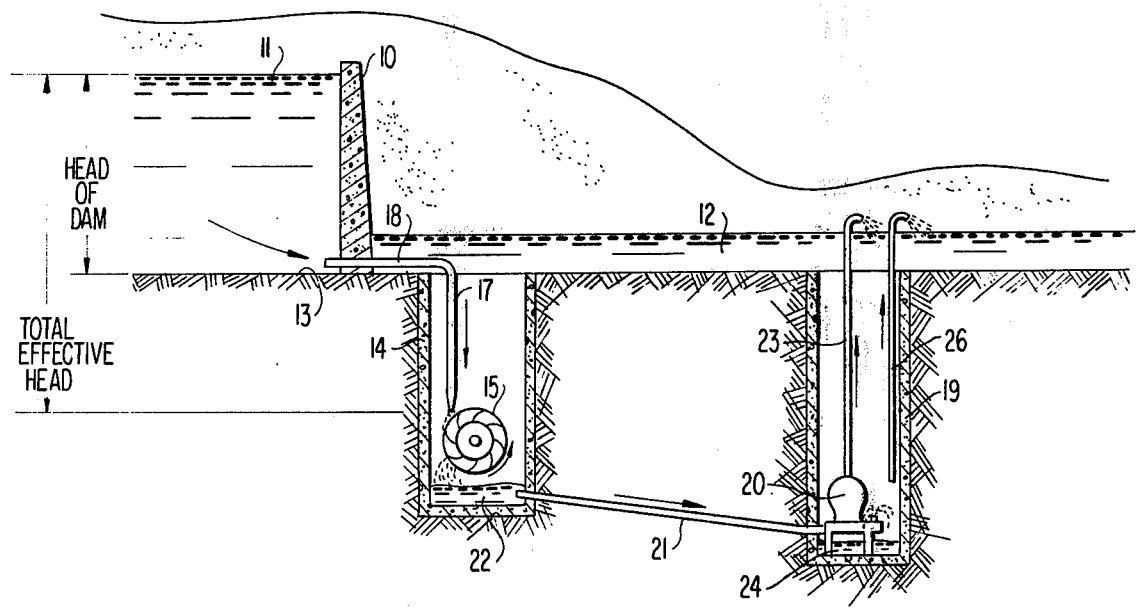
FIG. 2 is a partly schematic side elevational view thereof.

In any case, the total effective head will equal the head of the dam 10 plus the additional height or distance from ground level 13 down to the point in the pit 14 where water from the conduit 17 impinges on the turbine wheel, as shown by the legends in the drawings. As may be readily seen in FIG. 2, the total effective head in a practical embodiment could easily double the head afforded by the dam above ground and without the necessity for increasing the height of the dam.

Slightly downstream from the turbine generator pit 14, a second well pit 19 of somewhat greater depth is constructed and this second pit has positioned within it at its bottom a conventional hydraulic ram 20 or impulse pump. The inlet of the ram 20 is connected by a sloping conduit means 21 to the bottom of the turbine generator pit 14 which receives continuously discharge water 22 from the turbine means 15.

A vital and principal component of the invention is the hydraulic ram 20 and its unique utilization in the system to lift the sub-surface water discharged by the turbine means back to ground level, without loss of the increased energy achieved by the creation of the increased effective head. The hydraulic ram is a time-tested and proven reliable pump which utilizes the force of water flowing to it exclusively for its operation, in this case the turbine discharge water 22 flowing by gravity through the sloping conduit 21. With proper installation, the ram 20 is capable of lifting water many times higher than its vertical distance below a water supply source, the turbine discharge. Inasmuch as it does not require auxiliary power for its operation, the ram 20 does not consume any of the added power gained through the invention which multiplies, in effect, the head (water pressure) of the otherwise conventional dam.

Hydraulic rams are customarily installed to raise surface water, such as streams, to elevated storage tanks or the like. A ram has not heretofore been utilized as a constituent part of a hydroelectric power system such as the system embodying this invention.

It will be understood that a small hydroelectric power installation according to the invention may require a single ram 20 of adequate rating to evacuate the entire turbine discharge 22. Larger installations may dictate the need for a plurality of rams hydraulically connected in parallel to handle greater volumes of turbine discharge water.

A vertical conduit or pipe 23 is connected with the outlet of hydraulic ram 20 to elevate the ram discharge to ground level where it enters into or forms the tailwater 12. Some inevitable waste water 24 from the ram means will collect in the bottom of pit 19, and such waste water may be returned above ground to the tailwater 12 by an auxiliary sump pump 25 having a vertical discharge pipe 26.

The operation of the system is as follows. Headwater 11 behind the dam 10 flows by gravity through the conduit 17 to drive the impulse turbine means 15 coupled with electrical generator means 16 located near the bottom of the dry pit 14. The turbine discharge water 22 which collects in a sump beneath the turbine at the bottom of pit 14 flows by gravity through the sloping conduit 21 to the hydraulic ram means 20 in the bottom of the pit 19 at a somewhat lower elevation. Through the energy imparted to the discharge water during its fall through the conduit 21 to the hydraulic ram, water is forced upwardly through the vertical conduit 23 so as to be discharged into the tailwater 12 or to form such tailwater downstream of the dam.

Inasmuch as no energy in the form of "head" from the surface of the dam 10 to the subterranean elevation of the turbine means 15 is expended to operate the ram 20, the total effective head is comprised of the normal head of the dam plus the head of the column of water from the base of the dam down to the turbine. The objective of the invention is thus fully achieved by the system or method.

It should be mentioned that in hydromechanical applications the below ground level turbine means is coupled to a vertical output shaft, from which mechanical power take-offs can be extended at approximately ground level to drive various machinery.

The construction details and arrangements of the principal components of the invention suggest other forms and arrangements for alternative applications to hydroelectric power generation, without departing from the spirit and scope of the invention. One such of many other uses for the process is to increase the effective head of a power dam for the production of usable levels of mechanical energy for driving heavy rotating equipment as required for milling, crushing, rolling, and grinding, from otherwise inadequate low water volume/head sources.

Another use of the invention is to pump, without additional cost, the turbine discharge water from a hydroelectric power plant, whether of the type described herein or of a conventional type, to a holding reservoir elevated from the dam for future use during peak load electric consumption periods. Such systems have found limited use not for lack of desirability, but because storage pumping through conventional means has proven to be prohibitively costly.

Since the drawings of the system are schematic in nature, various mechanical details unnecessary to a proper understanding of the invention and unnecessary for its basic operation are omitted. For example, valves can be placed at appropriate points in conduits 18 and 21 to facilitate shutting down the system at times for repairs or the like.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A hydroelectric power generating system comprising a man-made dam of predetermined fixed height above a water stream bed forming an elevated head of water behind the dam, a first subterranean well pit somewhat downstream from the base of the dam and extending for a substantial distance below the base of the dam to increase substantially the effective head of the dam, said well pit being substantially closed at its sides and bottom, hydroelectric generating means near the bottom of the first well pit, means delivering dam head water to said generating means near the bottom of the well pit, a second subterranean well pit downstream from the first pit hydraulic ram means in the second well pit adapted to elevate water therein to the tailwater downstream from said dam, and gravity flow conduit means interconnecting said well pits whereby discharge water from said generating means in the first well pit is delivered to said hydraulic ram means in the second well pit continuously.

2. A hydroelectric power generating system according to claim 1, wherein said second well pit is deeper than the first well pit and said gravity flow conduit means is inclined between the first and second well pits.

3. A hydroelectric power generating system according to claim 1, and said hydroelectric generating means near the bottom of the first well pit comprising an impulse-type turbine means.

4. A method of increasing the effective head of a dam for power generation comprising constructing a dam of fixed height above a water stream to thereby create an elevated head of water behind the dam, forming first and second spaced well pits downstream from the base of the dam to subterranean levels substantially below the base of the dam and the bed of said water stream, delivering head water from behind the dam to the bottom of the first well pit to drive hydroelectric generating means therein, and delivering discharge water continuously from the bottom of the first pit by gravity flow to the second well pit to operate hydraulic ram means therein and thereby elevating the discharge water from the second well pit and delivering it to the tailwater downstream from the dam.

* * * * *